J. A. PIERCE.
Carbureter.
No. 165,862. 
Patented July 20, 1875.
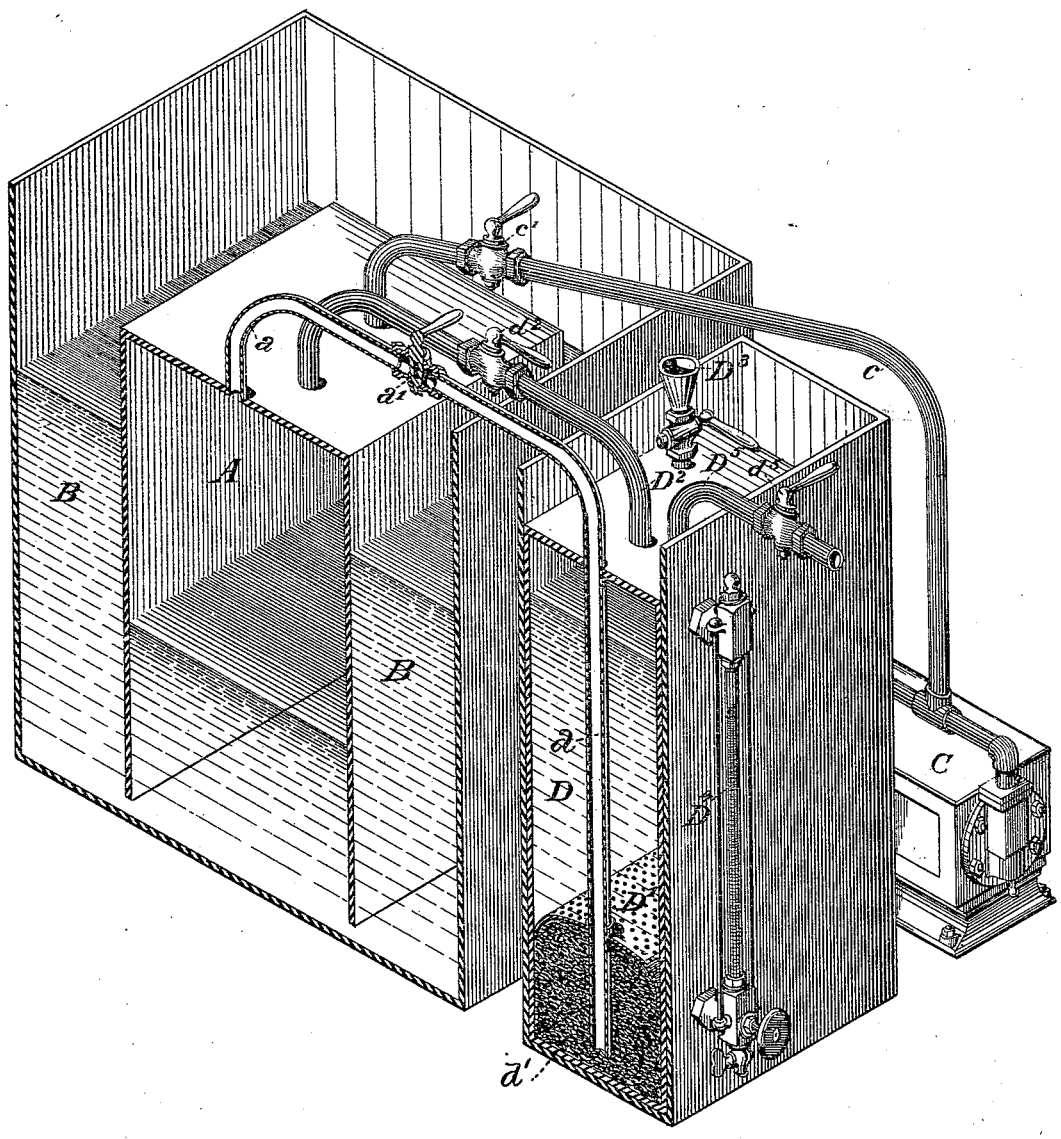
Witnesses:
John Everding,
J. E. Harding.
Inventor:
John A. Pierce,
by J. Snowden Bell.
atty.

UNITED STATES PATENT OFFICE.

JOHN A. PIERCE, OF PHILADELPHIA, PENNSYLVANIA.

IMPROVEMENT IN CARBURETERS.

Specification forming part of Letters Patent No. 165,862, dated July 20, 1875; application filed June 9, 1875.

*To all whom it may concern:*

Be it known that I, JOHN A. PIERCE, of the city and county of Philadelphia, in the State of Pennsylvania, have invented certain new and useful Improvements in Carbureters, of which the following is a specification:

The object of my invention is to provide, in an apparatus in which air is saturated with inflammable vapor by passing the air through a liquid hydrocarbon, simple and efficient means for preventing waste of gas while the apparatus is not in use, and also for automatically feeding the gas to the burners; to which ends my invention consists in combining an air-pump and an open-bottomed air-reservoir, placed in a water-tank, with a hydrocarbon-chamber, a perforated diaphragm, porous packing, and a back-pressure pipe, all as hereinafter more fully set forth.

The accompanying drawing is a perspective section of an apparatus for carbureting air embodying my improvements.

To carry out the object of my invention, I provide an open-bottomed air-reservoir, A, which may be of any desired form and dimensions, and which is set in a water-tank, B, a short distance above the bottom of the latter. An air-condensing pump, C, which may be worked either by hand or power, according to the dimensions of the apparatus, is placed at a convenient distance from the tank B, and is connected by a pipe, $c$, provided with a cock or valve, $c'$, with the upper portion of the air-reservoir A. A chamber, D, serves to contain the liquid hydrocarbon which furnishes the inflammable gas, and is connected with the reservoir A by an air-pipe, $a$, having a cock or valve, $a'$. The pipe $a$ extends from the top of the reservoir A nearly to the bottom of the chamber D, passing through a diaphragm, $D^1$, which extends entirely across the chamber D some distance above its bottom. The diaphragm $D^1$ is perforated with small orifices through its entire extent, and is preferably made dished or bowl-shaped, so as to expose as large an amount of surface as practicable. Packing $d^1$, of wire, pumice-stone, or other suitable material having numerous interstices, is placed in the space beneath the diaphragm and around the air-pipe $a'$. The upper portions of the reservoir A and chamber B are connected by the back-pressure pipe $D^2$, which is furnished with a cock, $d^2$. A suitable mouth-piece, $D^3$, should be provided for filling the chamber D, and a gage, $D^4$, may be added to indicate the level of the liquid within it. A supply-pipe, $D^5$, having a cock or valve, $d^5$, leads from the upper portion of the chamber D to the burners.

The operation of an apparatus constituted as above is as follows: The chamber D having been first filled with any suitable liquid hydrocarbon, and the cocks $c'$ and $a'$ being opened, and the mouth-piece cock closed, air is forced, by the pump C, into the reservoir A, displacing the water, which rises in the tank B, surrounding it. When a sufficient quantity of air for an evening's consumption has been forced into the reservoir the operation of the pump is stopped and the cocks $c'$ and $d^2$ closed, when the pressure of the water forces the air through the air-pipe $a$ to the bottom of the hydrocarbon-chamber D, whence it percolates through the packing $d^1$, and, escaping from the orifice of the perforated diaphragm $D^1$, passes through the liquid in the chamber, and is led off in a carbureted condition by the supply-pipe $D^5$ to the burners. The packing and diaphragm serve to disseminate the air through the entire sectional area of the chamber D, so as to expose the air as thoroughly as practicable to the liquid therein; and, to the same end, the bottom of the air-pipe $a$ might be divided into a number of branches, if deemed advisable. When the lights are extinguished for the night the cocks $a'$ and $d^5$ are closed and the cock $d^2$ opened, and any gas generated in the chamber D passes through the back-pressure pipe $D^2$ to the air-reservoir A, to be utilized in charging the air therein, thus preventing waste, and avoiding the danger which would arise from allowing it (the gas) to escape in a free state to the burners.

The apparatus is of very simple construction, and may be placed in any suitable location, as in the yard or cellar of a building; and the pressure of the water being employed to force the air through the hydrocarbon-chamber to the burners, it is automatic in its action after an initial pressure of air has been produced in the reservoir by the pump.

I claim as my invention—

1. The combination of a condensing air-pump communicating with a stationary open-bottomed air-reservoir, a water-tank surrounding the air-reservoir, a connecting air-pipe, and a hydrocarbon-chamber, substantially as set forth.

2. The combination of a stationary open-bottomed air-reservoir surrounded by a water-tank, an air-pipe connecting the air-reservoir with the lower portion of a hydrocarbon-chamber, and an independent back-pressure pipe and valve connecting the upper portions of the air-reservoir and hydrocarbon-chamber, substantially as set forth.

JOHN A. PIERCE.

Witnesses:
J. SNOWDEN BELL,
O. M. BABCOCK.